United States Patent [19]

McCoy

[11] Patent Number: 4,570,741
[45] Date of Patent: Feb. 18, 1986

[54] MULTI-WHEEL DRIVE SYSTEM
[75] Inventor: Gregory A. McCoy, Bristol, Va.
[73] Assignee: Ingersoll-Rand Company, Woodcliff Lake, N.J.
[21] Appl. No.: 585,580
[22] Filed: Mar. 2, 1984
[51] Int. Cl.⁴ .................... B60K 17/356; B60K 1/00; B60K 7/00
[52] U.S. Cl. .................. 180/242; 180/65.5; 180/308
[58] Field of Search .................... 180/65.2, 65.5, 242, 180/243, 308

[56] References Cited
U.S. PATENT DOCUMENTS
3,811,525  5/1974  Stuart .................... 180/243
4,133,403  1/1979  Priddy, Jr. .................... 180/243

Primary Examiner—John J. Camby
Attorney, Agent, or Firm—R. J. Falkowski

[57] ABSTRACT

A selectable multi-wheel drive system for a mining machine has an electrical motor directly driving a wheel and driving a hydraulic pump through a clutching mechanism. Another wheel is connected to be driven by a hydraulic motor connected through a hydraulic circuit to be driven by the hydraulic pump. The hydraulic pump is selectively connected to the hydraulic motor so that one wheel or both wheels may be driven. The hydraulic circuit is controlled so that when in a one wheel drive condition the hydraulic motor is placed in a free-wheeling mode and no losses occur in the hydraulic circuit because of connection to the wheel.

6 Claims, 1 Drawing Figure

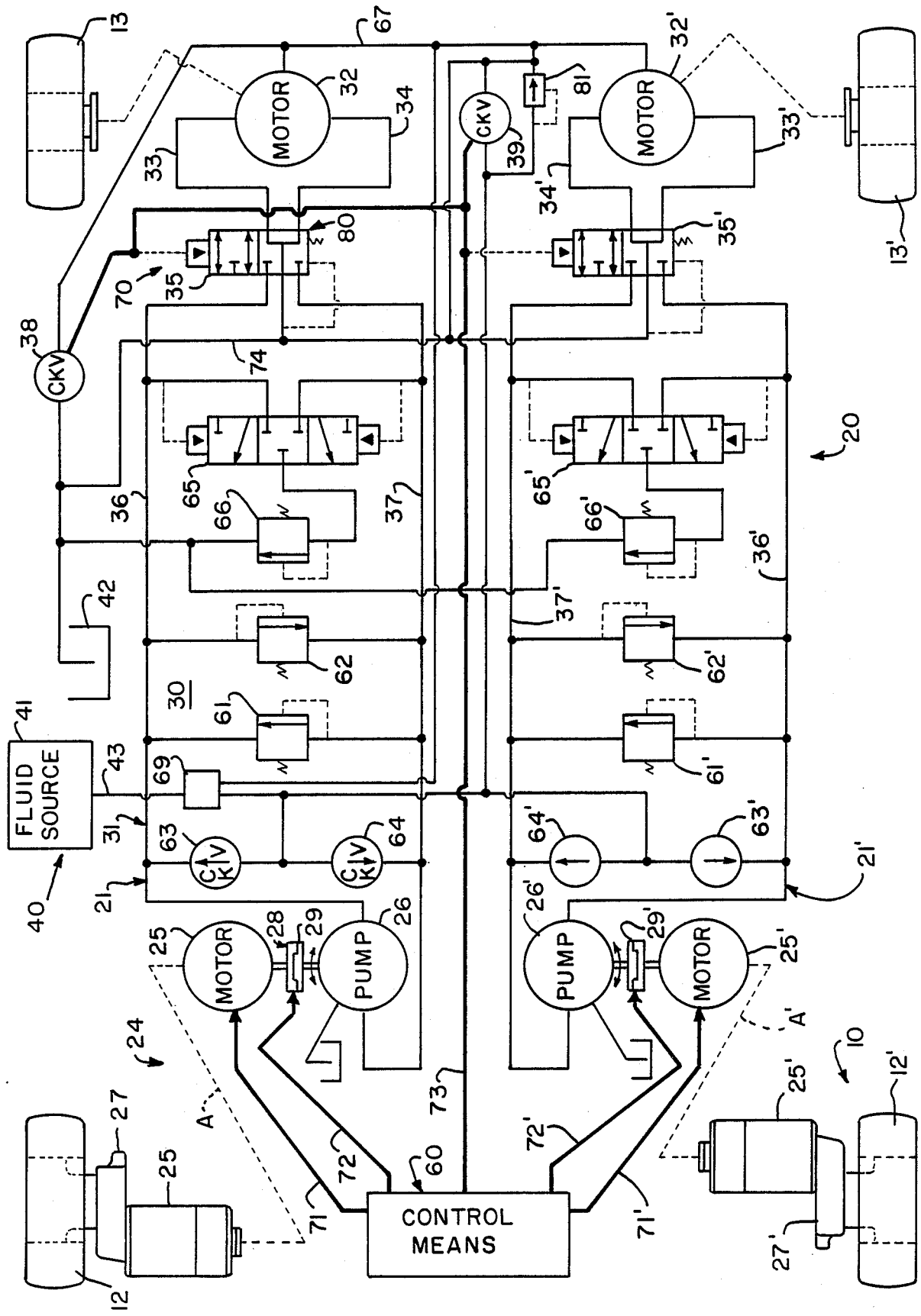

MULTI-WHEEL DRIVE SYSTEM

This invention relates to selectable four wheel drive systems for vehicles, particularly to systems in mining vehicles and the like for selecting either two or four wheel drive.

In off-road vehicles it is often desirable to have equipment that can operate in either a two or four wheel mode. Vehicles such as mining vehicles operate over terrain having widely varying conditions and often need the capacity to operate at the greater efficiency available with two wheel drive and to shift into four wheel drive whenever conditions require greater traction. In prior art selectable wheel drive systems, the circuits required are either relatively high energy loss systems, i.e., have low efficiency, when in two wheel operation, or the mechanism for shifting into four wheel operation is cumbersome and expensive or has greatly increased power loss associated with its use.

With this invention a four wheel tractive system is provided that operates easily and relatively efficiently in a four wheel mode and very efficiently in a two wheel mode. The system can easily be shifted by the operator back and forth between the modes and accomplishes this without complex mechanical, electronic, or hydraulic control systems. Also, a vehicle with such tractive system is operated in the two wheel or four wheel mode in the same manner and is controlled in the same way making it easy for the operator to handle under varying conditions.

The objects and advantages of this invention will be apparent from the following description of an embodiment of the invention.

FIG. 1 is a schematic drawing of a drive system according to this invention.

Referring to the FIGURE, a controlled traction vehicle of any known type such as a mining hauling vehicle (not shown) has a tractive means 10 adapted to support and move the vehicle over the surface and a propulsion means 20 for selectively driving the tractive means. Tractive means 10 comprises driving elements such as wheels 12, 13, 12', and 13'.

The propulsion means is connected to the tractive means for selectively driving the wheels of the tractive means and comprises two similar sections, a right section 21 and a left section 21', one for each side of the vehicle with each controlling the respective two wheels on the corresponding side of the vehicle. A common hydraulic system 40 having a fluid source 41 and a sump or storage tank 42 supplies pressurized hydraulic fluid to the left and right sections. In describing the propulsion means one side of the vehicle tractive means and its associated section is particularly identified, corresponding parts of the other side have identical numbers primed and the description with respect to one side and section applies to the other side and section.

Referring to right section 21 which controls wheels 12 and 13, propulsion means 20 has a drive means 24 connected to wheel 12 for driving wheel 12 and to a hydraulic pump 26 for driving the hydraulic pump; a clutching means 28 for selectively connecting hydraulic pump 26 to be driven by the drive means; a hydraulic motor 32 connected to wheel 13; a hydraulic means 30 for connecting hydraulic pump 26 to a hydraulic motor 32; and a control means 60 for selectively operating drive means 24, clutching means 28 and a means 70 for placing the system in free-wheeling operation. Means 70 for placing the system in free-wheeling operation includes a pressure release means 80 for releasing hydraulic pressure.

Drive means 24 comprises an electrical drive motor 25, shown in a mechanical relation and a schematic relation as indicated by a dashed line A, mechanically connected to wheel 12 and to clutching means 28 through a gear reducer assembly 27 connected between drive motor 25 and wheel 12. Electrical motor 25 is powered by a battery or other electrical power source (not shown) in any manner known in the art. During operation of electrical motor 25, hydraulic pump 26 produces a hydraulic output proportional to and in the direction of the output of electrical motor 25. Clutching means 28 comprises a clutch mechanism 29 of any known type that can be selectively operated to connect the drive output of electrical motor 25 to drive hydraulic pump 26.

Hydraulic means 30 has a hydraulic circuit 31 having a first conduit 33, and a second conduit 34, a third conduit 36, and a fourth conduit 37. Hydraulic circuit 31 has a first relief valve 61 and a second relief valve 62 connected between conduit 36 and 37, a first check valve 63 and a second check valve 64, and an oil discharge valve 65 and a relief valve 66.

Hydraulic system 40 supplies hydraulic fluid from hydraulic source 41 through a conduit 43 and a flow divider 69 to check valve 63 and check valve 64 as required to furnish fluid for required operation of the propulsion means in a manner known in the art. Flow divider 69 assures adequate fluid flow both to conduits 36 and 37 and to a conduit 67 connected in the bleed system of hydraulic motor 32. Relief valves 61 and 62 relieve excessive pressures that may build up in the system between conduits 36 and 37 during operation.

Hydraulic system 40 also has a means for recirculating hydraulic fluid in hydraulic circuit 31 back to sump 42 during operation, primarily for cooling purposes, that comprises oil discharge valve 65 and relief valve 66. Discharge valve 65 is connected to sense the pressure difference between the fluid in conduits 36 and 37 and to shift to connect the low pressure side to sump 42 through relief valve 66 thereby providing an increased circulation of the fluid from the system to the sump. This occurs only when clutch 29 is engaged and pump 26 is operating to produce pressurized fluid flow through the conduits. Relief valve 66 maintains a low pressure difference above sump pressure under this condition. When the pressure difference between conduits 36 and 37 is below a selected level, valve 65 is in the center position and blocks flow.

Control means 60 is shown schematically and is of any type known in the art. The selection of operating parameters depends on the type of vehicle and application encountered. The control means functionally provides, as shown schematically, a signal control 71 to electrical motor 25 for varying speed, torque, and direction as required for specific operating conditions, and a control signal 72 for activating and deactivating clutching mechanism 29 to engage electrical motor 25 to drive hydraulic pump 26.

Pressure release means 80 operates to release hydraulic pressure in the hydraulic circuit upon receiving a hydraulic control signal from control means 60 along a hydraulic line 73 and comprises a relief valve 35, a pilot controlled check valve 38 and a pilot controlled check valve 39. Hydraulic signal 73 determines the position of relief valve 35, pilot controlled valve 38, and pilot controlled valve 39. When a four wheel operation signal, i.e., pressurized fluid condition, is provided along line 73, valve 38 is opened and valve 39 is closed, and valve 35 is shifted to its full flow condition to connect conduit 36 to conduit 33 and conduit 37 to conduit 34. Motor 32 is a type that has a free-wheeling control mechanism controlled by the pressure applied to its bleed outlet, and is placed in a free-wheeling mode when a selectively higher pressure is applied to its bleed outlet. The opening of valve 38 releases pressure along conduit 67 to sump 42 to maintain it in its normal operating condition to be driven by hydraulic pump 26. A relief valve 81 releases upon momentary pressure peaks to protect the system during changing of modes.

When clutch 29 is operated to disconnect electric motor 25 from pump 26 the hydraulic signal along line 73 is changed to close valve 38 and open valve 39. This change of pressure also moves valve 35 to its release position (shown). The application of pressure to the bleed outlet of motor 32 and the shifting of valve 35 places motor 32 in a free-wheeling condition and places the flow path through motor 32 in a closed loop and connects it to sump 42 along a line 74 through valve 35 to thereby eliminate any induced losses because of fluid flow created by the rotation of motor 32 as it is driven by wheel 13.

In the operation of the vehicle the operator would normally be operating in a two wheel mode in which clutch mechanisms 29 and 29' are disengaged and would control the operation of motors 25 and 25' to control the movement of the vehicle through drive wheels 12 and 12'.

When encountering unusual terrain or difficult traction conditions, the operator engages the clutching mechanisms to drive hydraulic pump 26 and 26' and shifts motors 32 and 32' from their free-wheeling mode by releasing pressure to the bleed system of motors 32 and 32' and shifts relief valves 35 and 35' to connect motors 32 and 32' to pumps 26 and 26', respectively. This drives hydraulic motors 32 and 32' which operate wheels 13 and 13'. The wheels on each side of the vehicle are thereby hydraulically interlocked.

When four wheel drive is no longer needed, the operator operates the control means to disengage the clutching mechanism and disconnect the electric motors from the hydraulic pumps. This places hydraulic motors 32 and 32' in the free-wheeling mode to enable them to freely move with wheels 13 and 13' without creating any significant losses in the hydraulic system.

I claim:

1. A controlled traction vehicle having two sides and four tractive wheels with a first and second wheel adjacent one side and a third and fourth wheel adjacent the other side and a propulsion means connected to the wheels for selectively driving the wheels, said propulsion means comprising:

a first hydraulic pump;
   a first electrical motor connected to drive the first wheel;
   a first clutching means connected to the first electrical motor and the first hydraulic pump for selectively connecting said first electrical motor to drive said first pump;
   a hydraulic system having a first hydraulic power circuit connected to the first pump and a second hydraulic circuit;
   a first hydraulic motor connected in the first hydraulic circuit to be driven by the first pump and connected to drive the second wheel;
   a second hydraulic pump;
   a second electrical motor connected to drive the third wheel;
   a second clutching means connected to the second electrical motor and the second hydraulic pump for selectively connecting said second motor to drive said second pump;
   said second hydraulic power circuit connected to the second pump;
   a second hydraulic motor connected in the second hydraulic circuit to be driven by the second pump and connected to drive the fourth wheel;
   a control means for controlling the operation of the first and second electrical motor and the first and second clutching means.

2. A traction vehicle according to claim 1 also comprising a means for releasing the hydraulic pressure in the hydraulic motor when the hydraulic pump is not connected to the drive means.

3. A traction vehicle according to claim 1 also comprising a means for releasing the hydraulic pressure in the hydraulic system when the hydraulic pumps are not connected to the electrical motors.

4. A controlled traction vehicle having two sides and four tractive wheels with a first and second wheel adjacent one side and a third and fourth wheel adjacent the other side and a propulsion means connected to the wheels for selectively driving the wheels, said propulsion means comprising:

a first hydraulic pump;
   a first drive means for driving the first wheel;
   a first clutching means connected to the first drive means and the first hydraulic pump for selectively connecting said first drive means to drive said first pump;
   a hydraulic system having a first hydraulic power circuit connected to the first pump and a second hydraulic circuit;
   a first hydraulic motor connected in the first hydraulic circuit to be driven by the first pump and connected to drive the second wheel;
   a second hydraulic pump;
   a second drive means for driving the third wheel;
   a second clutching means connected to the second drive means and the second hydraulic pump for selectively connecting said second drive means to drive said second pump;
   said second hydraulic power circuit connected to the second pump;
   a second hydraulic motor connected in the second hydraulic circuit to be driven by the second pump and connected to drive the fourth wheel;
   a control means for controlling the operation of the first and second drive means and the first and second clutching means.

5. A traction vehicle according to claim 4 also comprising a means for releasing the hydraulic pressure in the first hydraulic motor when the first drive means is not connected to the first hydraulic pump.

6. A traction vehicle according to claim 5 also comprising a means for releasing the hydraulic pressure in the hydraulic system when the first and second hydraulic pumps are not respectively connected to the first and second drive means.

* * * * *

REEXAMINATION CERTIFICATE (2834th)

United States Patent [19]

McCoy

[11] B1 4,570,741
[45] Certificate Issued Apr. 9, 1996

[54] MULTI-WHEEL DRIVE SYSTEM

[75] Inventor: Gregory A. McCoy, Bristol, Va.

[73] Assignee: Long Airdox Company, Oak Hill, W. Va.

Reexamination Request:
No. 90/003,654, Dec. 6, 1994

Reexamination Certificate for:
Patent No.: 4,570,741
Issued: Feb. 18, 1986
Appl. No.: 585,580
Filed: Mar. 2, 1984

[51] Int. Cl.⁶ .......................... B60K 17/356; B60K 1/00; B60K 7/00
[52] U.S. Cl. .......................... 180/242; 180/65.5; 180/308
[58] Field of Search .......................... 180/65.2, 65.5, 180/242, 243, 308

[56] References Cited

U.S. PATENT DOCUMENTS 3,334,702  8/1967  Granryd .......................... 180/243
4,570,741  2/1986  McCoy .......................... 180/242

OTHER PUBLICATIONS

Evans, H; A Review of Efficient Hydraulic Circuits in Selected Underground Mining Machines; SAE Technical Paper; SP–551; Milwaukee, Wisconsin, Sep. 12–15, 1983 (831271).

*Primary Examiner*—Anne Marie Boehler

[57] ABSTRACT

A selectable multi-wheel drive system for a mining machine has an electrical motor directly driving a wheel and driving a hydraulic pump through a clutching mechanism. Another wheel is connected to be driven by a hydraulic motor connected through a hydraulic circuit to be driven by the hydraulic pump. The hydraulic pump is selectively connected to the hydraulic motor so that one wheel or both wheels may be driven. The hydraulic circuit is controlled so that when in a one wheel drive condition the hydraulic motor is placed in a free-wheeling mode and no losses occur in the hydraulic circuit because of connection to the wheel.

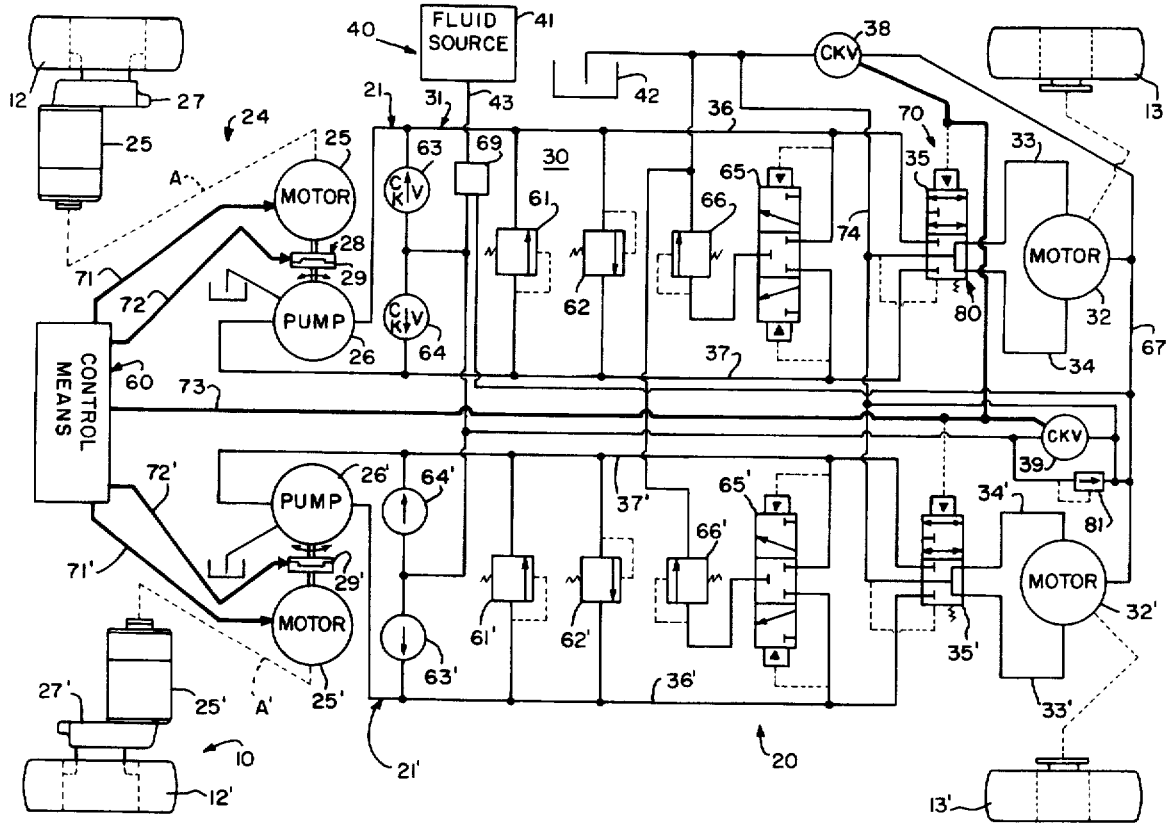

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 3-6 is confirmed.

Claim 2 is determined to be patentable as amended.

2. A traction vehicle according to claim 1 also comprising a means for releasing the hydraulic pressure in said first and second hydraulic motors when said first and second hydraulic pumps are not connected to said first and second [drive means] *electric motors* respectively.

* * * * *